E. H. NEWMAN.
ROAD FINISHING MACHINE.
APPLICATION FILED JULY 28, 1916.

1,228,811.

Patented June 5, 1917.
2 SHEETS—SHEET 1.

WITNESSES

INVENTOR
E. H. Newman
BY
ATTORNEYS

E. H. NEWMAN.
ROAD FINISHING MACHINE.
APPLICATION FILED JULY 28, 1916.

1,228,811.

Patented June 5, 1917.
2 SHEETS—SHEET 2.

WITNESSES

INVENTOR
E. H. Newman
BY
ATTORNEYS

UNITED STATES PATENT OFFICE.

ELLWOOD HAMPTON NEWMAN, OF SPRING LAKE BEACH, NEW JERSEY.

ROAD-FINISHING MACHINE.

1,228,811.  Specification of Letters Patent.  Patented June 5, 1917.

Application filed July 28, 1916. Serial No. 111,813.

*To all whom it may concern:*

Be it known that I, ELLWOOD H. NEWMAN, a citizen of the United States, and a resident of Spring Lake Beach, in the county of Monmouth and State of New Jersey, have invented a new and Improved Road-Finishing Machine, of which the following is a full, clear, and exact description.

Among the principal objects which the present invention has in view are: to provide means for smoothing the surface of roads by eliminating surface ridges and hummocks therefrom; to provide an implement of the character mentioned with means for shifting laterally the top surface of a roadbed; and to provide an implement of the character mentioned with a ballast which may be used as a filler for repairing the roadbed.

*Drawings.*

Figure 1 is a top plan view of an implement of the character mentioned constructed and arranged in accordance with the present invention, showing the same as in service;

*Description.*

Figure 2:
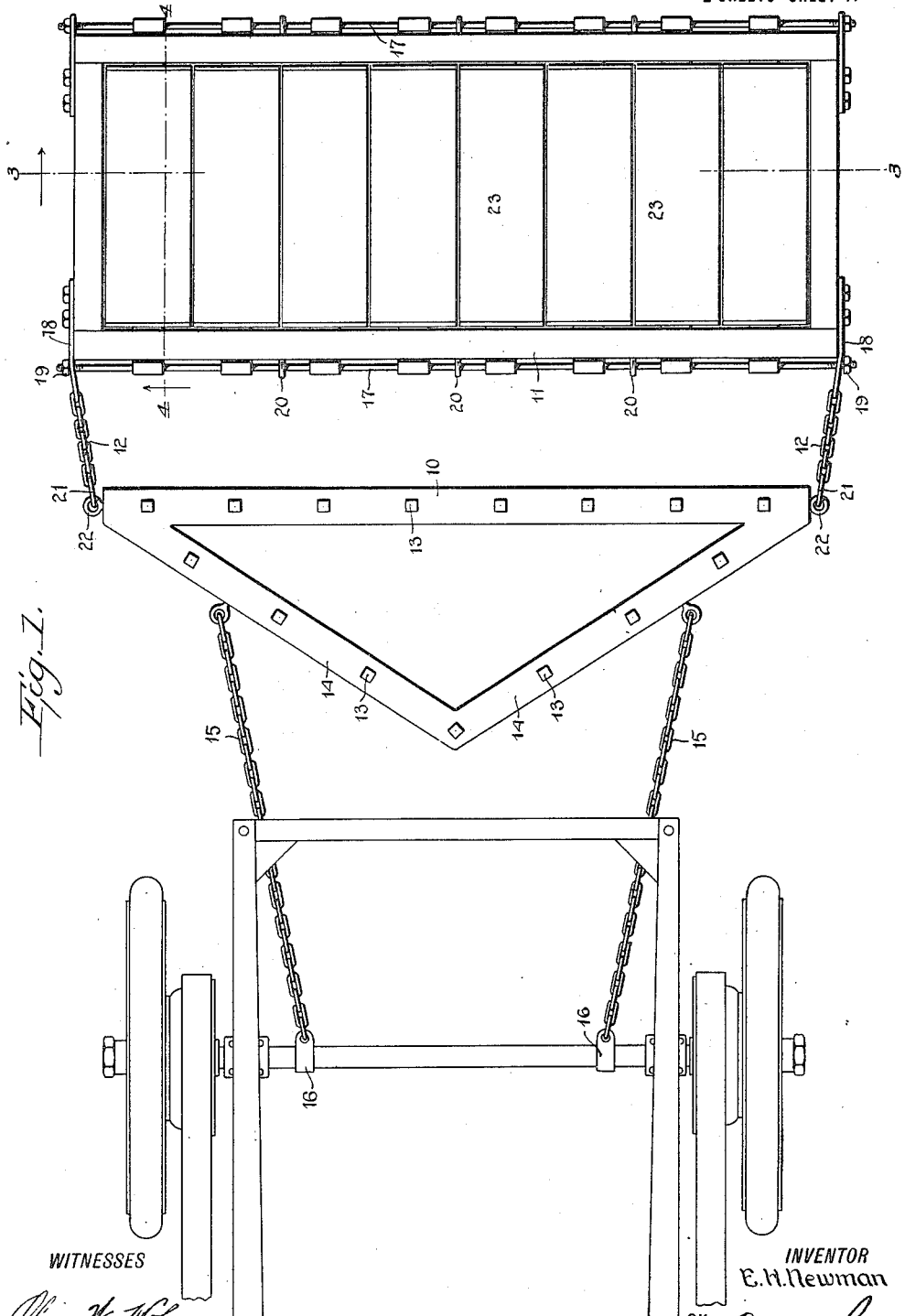
Fig. 2 is a bottom plan view of the main body of the implement.
Figure 2:
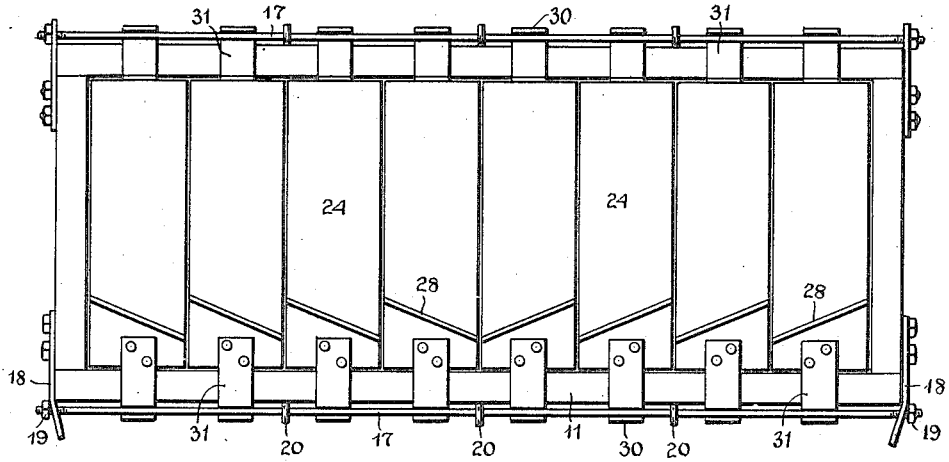
Figure 3:
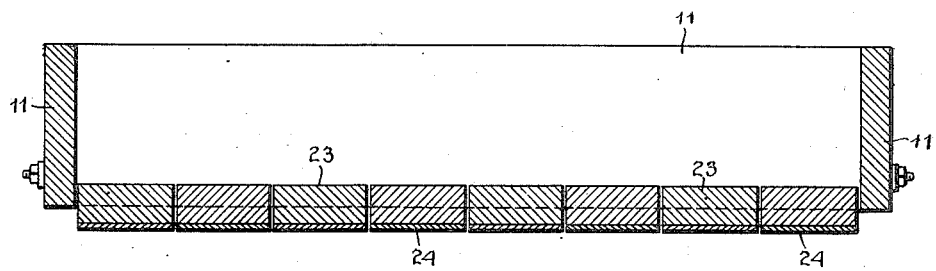
Fig. 3 is a cross section taken as on the line 3—3 in Fig. 1.
Figure 4:
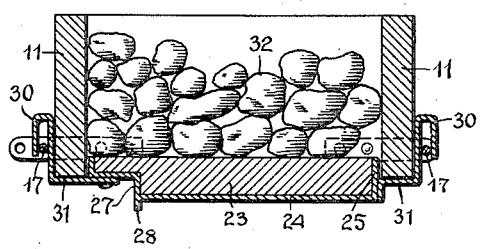
Fig. 4 is a longitudinal section taken as on the line 4—4 in Fig. 1.
Figure 5:
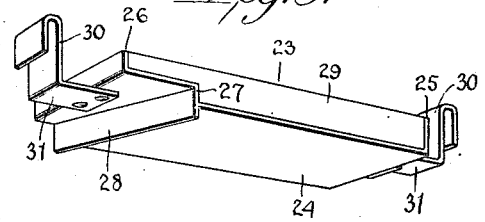
Fig. 5 is a detail view in perspective showing one of the scraping and smoothing units.

As shown best in Fig. 1 of the drawings, a triangular harrow 10 may be employed in conjunction with the scraping and smoothing body having a frame 11. When in service, the harrow 10 is connected to the frame 11 by short chains 12.

The harrow 10 has a series of surface-scratching spikes 13, arranged at regular intervals lengthwise of the rear cross bar and of two triangular sides 14. The spikes in the sides 14, it will be observed, are so disposed as to interline with the spikes 13 in the cross bar of the frame.

The harrow is provided with pull-chains 15, by which it may be attached in service to clips, such as indicated by the numeral 16, provided on the axle of a power-driven or horse-driven vehicle.

As above mentioned, the scraper and smoother have a frame 11. The frame 11 is constructed from any suitable material, that shown in the drawings being heavy wooden beams. The frame is oblong in shape and is provided with supporting rods 17 at the front and rear of the said frame. The rods 17 are held in place by metal straps 18, through perforations in which the ends of the rods 17 extend. The ends are threaded to receive the nuts 19.

Intermediate the straps 18, the rods are supported by eye-bolts 20. The forward ends of the straps 18, as shown in Fig. 1, are permanently attached to the chains 12. The forward ends of the chains 12 have hooks 21, which may engage the eye-bolts 22 in the harrow 10, or may be engaged directly by the tractor or horse-drawn vehicle if so desired.

The rods 17 normally support the sleds 23. The sleds 23 are shod with metal shoes 24 on the under side. The ends of the shoes 24 are bent up to form the flanges 25 at the rear of the sleds, and the flanges 26 at the front of the sleds. Intermediate the two flanges and adjacent the forward end of each sled, an abutment 27 is formed from which extends a scraping edge 28.

Fitted to the shoe 24, is a floor plate which is preferably formed of wood. The sleds, as seen best in Fig. 2 of the drawings, are relatively long and narrow, and are disposed in parallel arrangement, the interspaces being sufficient to permit the sleds to rise and fall independently. Each sled has at the ends thereof, a hook 30, which rises outside of the frame 11, and engages the rods 17 in guided relation. The horizontal extension 31 of each of the hooks 30 forms a stop which engages the frame 11 and is held thereby in action when so required.

When the sleds are disposed in juxtaposed relation as in the frame 11, the ballast weight 32 is loaded on to the sleds within the said frame. The ballast weight thus carried is preferably what is known as road-metal, and may be employed at any place where it is necessary for filling small depressions or "pot holes" found in roads.

The sleds 24 are disposed in groups in service, those having the edges 28 inclined backward in one direction and those having the edges 28 inclined backward in the opposite direction. When arranging the sleds within the frame 11, an equal numeral of each kind is employed. That is to say, all the sleds having the edges 28 inclined in the same direction are placed at one side of the longitudinal center of the frame 11, while the sleds having the edges 28 inclined in the opposite direction are placed at the opposite side of said median line. The result of this is that the material scraped from the road by each of the edges 28 of one sled is delivered into the path of the shoe 24 of the adjacent sled, while the crown of the road is denuded to a certain degree of the increment which the crown generally acquires by reason of the road traffic.

Operation.

When employed in conjunction with the harrow, the frame 11 is arranged as shown in Fig. 1 of the drawings. In this combination the earth is scarified by the spikes 13 and the surface of the road is thereby loosened. When the edges 28 are thereafter drawn across the loosened material, the said material is shifted in accordance with the inclination of the edges 28, the shoes 24 thereafter sliding over the newly placed material, settles the same, and rolls it or smooths it into position, generally into the lower spots of the road. It is obvious that as each of the sleds overruns an obstruction, it is held to its work by the ballast weight 32 held above the sleds in the frame 11.

As shown in Fig. 1 of the drawings, the implement is employed as a trailer behind an automobile. Its employment is designed particularly for automobile roads, and has for its primary object to prevent ridging incident to roads of this character. Therefore, it is the purpose to employ a relatively light implement, such as an ordinary automobile could draw, and to have the said implement drawn over sections of the road at relatively short periods. When cared for in this manner, it is obvious that a road would give satisfactory service for an increased length of time.

Claims.

1. An implement as characterized comprising a series of smoothing sleds; and means for holding said sleds in service arrangement, said means embodying a surrounding frame, and individual attachments between said frame and each of said sleds, said attachments embodying rods extended transverse said frame, and hooks engaging the same, said hooks being permanently attached to the front and rear ends of paired sleds.

2. An implement as characterized comprising a series of smoothing sleds; means for holding said sleds in service arrangement; and a plurality of scraping members, one attached to each of said sleds, said members being inclined rearwardly.

3. An implement as characterized comprising a series of smoothing sleds; and means for holding said sleds juxtaposed in service relation, thereby forming a floor for carrying broken particles placed thereon, said means forming surrounding rails for said floor.

4. An implement as characterized comprising a series of smoothing sleds; means for holding said sleds juxtaposed in service relation, thereby forming a floor for carrying broken particles placed thereon, said means forming surrounding rails for said floor; and a plurality of scraping members, one attached to each of said sleds and at the forward end thereof.

ELLWOOD HAMPTON NEWMAN.

Witnesses:
CHAS. H. CRAIG,
P. C. BROWN.